May 14, 1946. R. R. FRANZ ET AL 2,400,228
ACID LEVEL INDICATOR AND ELECTROLYTE CONDENSER FOR STORAGE BATTERIES
Filed Aug. 6, 1943
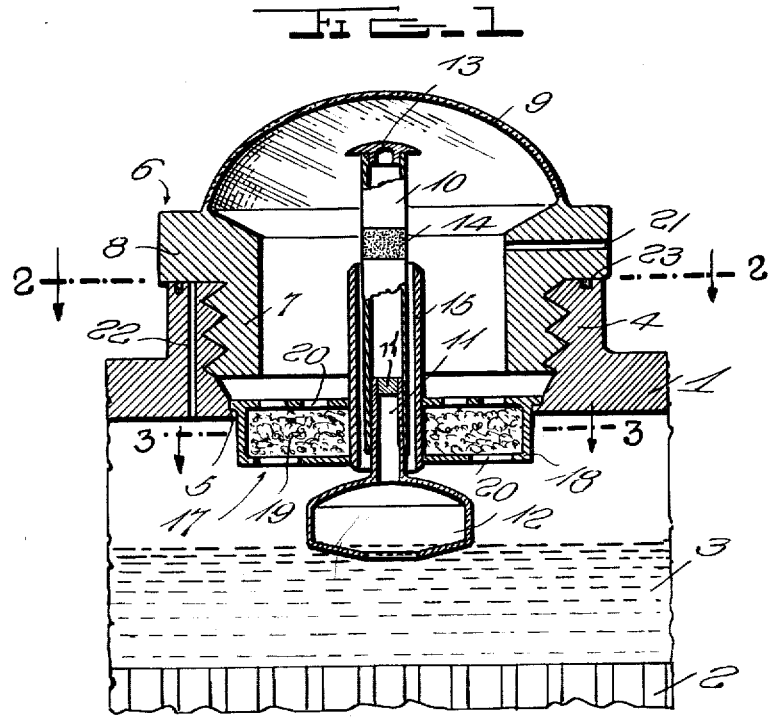
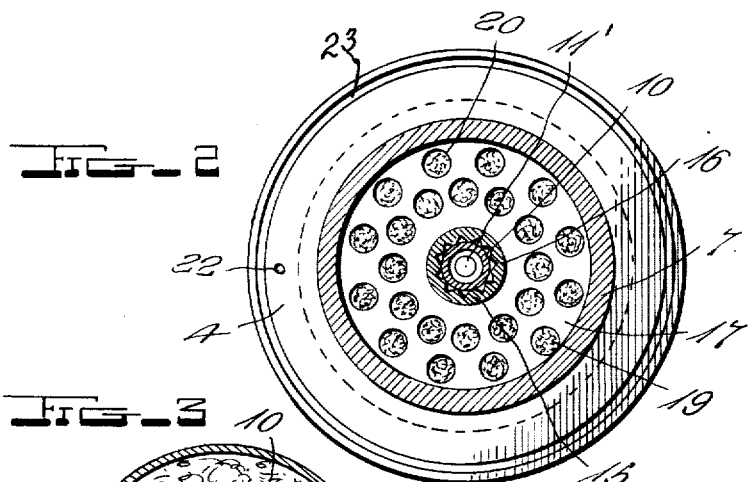
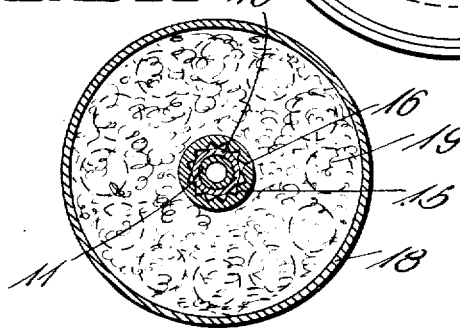
INVENTORS
ROSCOE R. FRANZ,
ROBERT T. FRANZ,
BY
*Robert J. Dennison*
ATTORNEY Patented May 14, 1946

2,400,228

UNITED STATES PATENT OFFICE 2,400,228

ACID LEVEL INDICATOR AND ELECTROLYTE CONDENSER FOR STORAGE BATTERIES

Roscoe R. Franz and Robert T. Franz,
Long Beach, Calif.

Application August 6, 1943, Serial No. 497,672

7 Claims. (Cl. 136—182)

The present invention relates to improvements in storage battery attachments and has reference more particularly to an acid level indicator and electrolyte condenser.

One of the important objects of the present invention is to provide a device of the above mentioned character that is adapted to be substituted in lieu of the conventional screw caps commonly employed for closing the filling openings of the cells of the battery.

Our device includes a means for affording a visual indicator of the liquid level of the electrolyte in the cells of the storage battery at all times.

A still further object resides in the provision of an indicator structure that includes a transparent dome through which the indicator shaft is visible, a condenser unit being associated with the indicator structure for condensing the vapors generated in the cells of the battery, thus keeping the transparent dome clear and preventing the formation of a residue on the dome which would preclude proper visibility through said transparent dome.

Another object is to provide a device of the above mentioned character that will permit the filling of the cells with liquid without the necessity of having to remove the indicator shaft, its float and the condenser unit.

A still further object is to provide a device of the above mentioned character that can be readily and easily installed and removed and due to its simplicity can be manufactured and sold at a low cost, the device being at all times positive and efficient in its operation.

Other objects and advantages of the invention will become apparent from the following description, when taken in connection with the accompanying drawing.

In the drawing, wherein like reference characters designate corresponding parts throughout the several views:

Figure 1 is a fragmentary sectional view through one cell of a storage battery showing our device secured in position in the filling opening, the device composing our invention also being shown in section;

Figure 2 is a transverse section taken approximately on the line 2—2 of Figure 1 looking in the direction of the arrows, and Figure 3 is a similar section taken on the line 3—3 of Figure 1, also looking downwardly.

Referring to the drawing, the numeral 1 designates the cover of a storage battery, the battery being provided with the usual plate assembly 2 which is submerged in the electrolyte solution 3. Each cell is formed with the internally threaded filling neck 4. An annular seat or flange 5 is formed in the lower portion of the filling neck, for a purpose to be presently described.

In lieu of the conventional screw cap or plug that is threaded into the neck 4 of each cell for closing the filling opening, we substitute the hollow plug 6 that is formed of any suitable acid resisting material such as hard rubber, glass or plastic.

This plug or cap 6 has an externally threaded portion 7 that screws into the internally threaded neck 4 and when in place, the flanged portion 8 of the plug rests on the top of the neck 4 as shown in Figure 1.

A transparent oval shaped dome 9 is secured to or formed integral with the top of the plug 6 for the purpose of permitting visual inspection of the indicator shaft. This dome 9 may be of glass or Celluloid.

The indicator comprises a tubular shaft 10, the lower open end thereof being telescopically fitted over the stem 11 that carries the hollow float 12 at its lower end, so that these two elements operate as one unit. However, the shaft may be slidably adjusted on the stem to vary the length of the indicator member depending upon the distance between the top of the cell and the top of the plates therein. The upper end of the float stem 11 is closed by a plug 11', to prevent the escape of gases collected within the float.

The hollow float 12 is designed to trap air and gas generated from the acid in the cells and as is shown in the drawing, the bottom of the float is inclined downward toward the opening formed in the center of the said bottom, thus permitting the complete ejection of liquid from within the float, thereby increasing buoyancy and accuracy.

The upper end of the indicator shaft is closed by a flanged cap 13, preferably colored black. The exterior of the tubular shaft is colored white with the exception of the red colored area 14.

The indicator shaft and the stem of the float are operable within a guide sleeve 15. To avoid capillary attraction, either the exterior of the indicator shaft or the interior of the guide sleeve is formed with longitudinal ribs. In the drawing, we have shown such ribs 16 as being formed on the interior of the guide sleeve 15. Also, the exterior of this guide sleeve is colored black.

Forming a salient part of our invention is the electrolyte condenser unit 17. This condenser unit composes a perforated chamber 18 that is flanged at its top for rest upon the annular flange 5. The interior of this perforated chamber is loosely filled with spun glass, glass wool, glass fibre, wool or any other acid-resisting material 19 and forms a means for condensing the vapors generated in the cell of the battery, thereby keeping the transparent dome 9 clear and free of residue collecting thereon which would otherwise be deposited on the interior of the transparent dome by the rising vapors and thus obstruct clear visibility of the indicator shaft through the transparent dome.

This condenser unit is adapted to support the lower end portion of the guide sleeve 15, the guide sleeve extending centrally through the chamber and being fixed thereto in any suitable manner. The perforations 20 formed in the top and bottom of the chamber 18 are large enough to permit the liquid to pass through this unit when the cell is being filled. However, the material 19 will prevent the escape of the acid vapors up into the body of the plug and reaching the transparent dome 9.

When filling the battery, it is only necessary to remove the plug 6 from the neck 4, the indicator and condenser unit remaining in place. However, when it is desired to test the specific gravity of the acid within the battery by means of a hydrometer, accessibility through the filling opening can be quickly obtained by removing the indicator and condenser unit from within the cell.

A vent for the battery cell is provided at 21 in the plug 6 and an additional vent 22 is provided for the cell in the neck 4 to facilitate filling of the cell with liquid when the plug 6 is removed. When the plug is in position in the neck, the flanged portion 8 covers the vent 22.

To prevent acid creepage an annular groove 23 is provided in the upper edge of the neck 4 and is filled with grease, or other acid resisting oily substance.

It will thus be seen from the foregoing description that we have provided an acid level indicator and electrolyte condenser for storage batteries that will at all times indicate the level of the liquid in the cells in a positive and efficient manner, and this without requiring the removal of the plugs from the filling openings of the cells.

Further, our device can be readily and easily installed and adjusted and will be inexpensive in its manufacture.

While we have shown the preferred embodiment of our invention, it is to be understood that various changes in the size, shape and arrangement of parts may be resorted to without departing from the spirit of the invention and the scope of the appended claims.

Having thus described our invention, what we claim is:

1. A device of the class described constructed to be secured in the filling opening of a cell of a storage battery, comprising a hollow plug, a transparent dome at the top of the plug, an indicator shaft extending longitudinally in the hollow plug and visible through said transparent dome, a float carried by the lower end of the indicator shaft, and means arranged in the filling opening below the hollow and about said indicator shaft plug for condensing the vapors generated in the cell to prevent such vapors reaching the transparent dome and forming a residue thereon.

2. A device of the class described comprising a hollow plug constructed to be removably secured in the filling opening of a storage battery cell, a transparent dome on the top of the hollow plug, an indicator member mounted for vertical operation in the plug and the cell, the upper portion of said indicator member being visible through said transparent dome, a float on the lower end of the indicator member for disposition in the liquid in the cell, and means mounted about the indicator below said plug for guiding vertical movement of the indicator and for condensing the vapors generated in the cell and preventing the same from collecting on the interior of the transparent dome.

3. A device of the class described comprising a hollow plug constructed to be removably secured in the filling opening of a storage battery cell, a transparent dome on the top of the hollow plug, an indicator member mounted for operation in the plug and the cell, the upper portion of said indicator member being visible through said transparent dome, a float on the lower end of the indicator member for disposition in the liquid in the cell, and means for condensing the vapors generated in the cell and preventing the same from collecting on the interior of the transparent dome, said means comprising a condenser unit removably mounted in the filling opening of the cell for disposition at the bottom of the hollow plug and formed with a vertical passage, the indicator member passing through the passage of said condenser unit and being vertically movable therethrough.

4. A device of the class described comprising a hollow plug constructed to be removably secured in the filling opening of a storage battery cell, a transparent dome on the top of the hollow plug, an indicator member mounted for operation in the plug and the cell, the upper portion of said indicator member being visible through said transparent dome, a float on the lower end of the indicator member for disposition in the liquid in the cell, means for condensing the vapors generated in the cell and preventing the same from collecting on the interior of the transparent dome, said means comprising a condenser unit removably mounted in the filling opening of the cell for disposition under the lower end of the hollow plug and formed with a vertical passage at its center, the indicator member extending through said condenser unit and being vertically movable therethrough, and a guide sleeve for the vertically movable indicator member carried by the condenser unit and extending upwardly therefrom about its passage.

5. A device of the class described comprising a hollow plug constructed to be removably secured in the filling opening of a storage battery cell, a transparent dome on the top of the hollow plug, an indicator member mounted for operation in the plug and the cell, the upper portion of said indicator member being visible through said transparent dome, a float at the lower end of the indicator member for disposition in the liquid in the cell, and means for condensing the vapors generated in the cell and preventing the same from collecting on the interior of the transparent dome, said means comprising a perforated chamber filled with vapor condensing material, said chamber being separate from the plug and removably mounted in the filling opening below the hollow plug, the indicator member passing through said chamber and being vertically movable therethrough.

6. A device of the class described comprising a hollow plug constructed to be removably secured in the filling opening of a storage battery cell, a transparent dome on the top of the hollow plug, an indicator member mounted for operation in the plug and the cell, the upper portion of said indicator member being visible through said transparent dome, a float at the lower end of the indicator member for disposition in the liquid in the cell, means for condensing the vapors generated in the cell and preventing the same from collecting on the interior of the transparent dome, said means comprising a perforated container filled with vapor condensing material and provided with an outstanding flange for engaging walls of the filling opening and removably supporting the container in the filling opening below the hollow plug, and a guide sleeve for the indicator member extending centrally through said condenser chamber and vertically therefrom, the indicator member being vertically movable through said guide sleeve.

7. A device of the class described comprising a hollow plug constructed to be removably secured in the filling opening of a storage battery cell, a transparent dome on the top of the hollow plug, an indicator member mounted for operation in the plug and the cell, the upper portion of said indicator member being visible through said transparent dome, a float at the lower end of the indicator member for disposition in the liquid in the cell, means for condensing the vapors generated in the cell and preventing the same from collecting on the interior of the transparent dome, said means comprising a perforated chamber filled with vapor condensing material and removably mounted in the filling opening separate from and below the hollow plug, and a guide sleeve for the indicator member extending centrally through said condenser chamber and vertically therefrom, the indicator member being freely movable vertically through said guide sleeve, and the interior of the guide sleeve being formed with longitudinally extending inwardly projecting ribs.

ROSCOE R. FRANZ.
ROBERT T. FRANZ.

Certificate of Correction

Patent No. 2,400,228.  May 14, 1946.

ROSCOE R. FRANZ ET AL.

It is hereby certified that errors appear in the printed specification of the above numbered patent requiring correction as follows: Page 2, first column, line 70, claim 1, after the word "hollow" insert *plug*; line 71, same claim, after "shaft" strike out "plug"; and that the said Letters Patent should be read with these corrections therein that the same may conform to the record of the case in the Patent Office.

Signed and sealed this 13th day of August, A. D. 1946.

[SEAL]

LESLIE FRAZER,
*First Assistant Commissioner of Patents.* hollow plug constructed to be removably secured in the filling opening of a storage battery cell, a transparent dome on the top of the hollow plug, an indicator member mounted for operation in the plug and the cell, the upper portion of said indicator member being visible through said transparent dome, a float at the lower end of the indicator member for disposition in the liquid in the cell, means for condensing the vapors generated in the cell and preventing the same from collecting on the interior of the transparent dome, said means comprising a perforated container filled with vapor condensing material and provided with an outstanding flange for engaging walls of the filling opening and removably supporting the container in the filling opening below the hollow plug, and a guide sleeve for the indicator member extending centrally through said condenser chamber and vertically therefrom, the indicator member being vertically movable through said guide sleeve.

7. A device of the class described comprising a hollow plug constructed to be removably secured in the filling opening of a storage battery cell, a transparent dome on the top of the hollow plug, an indicator member mounted for operation in the plug and the cell, the upper portion of said indicator member being visible through said transparent dome, a float at the lower end of the indicator member for disposition in the liquid in the cell, means for condensing the vapors generated in the cell and preventing the same from collecting on the interior of the transparent dome, said means comprising a perforated chamber filled with vapor condensing material and removably mounted in the filling opening separate from and below the hollow plug, and a guide sleeve for the indicator member extending centrally through said condenser chamber and vertically therefrom, the indicator member being freely movable vertically through said guide sleeve, and the interior of the guide sleeve being formed with longitudinally extending inwardly projecting ribs.

ROSCOE R. FRANZ.
ROBERT T. FRANZ.

Certificate of Correction

Patent No. 2,400,228. May 14, 1946.

ROSCOE R. FRANZ ET AL.

It is hereby certified that errors appear in the printed specification of the above numbered patent requiring correction as follows: Page 2, first column, line 70, claim 1, after the word "hollow" insert *plug*; line 71, same claim, after "shaft" strike out "plug"; and that the said Letters Patent should be read with these corrections therein that the same may conform to the record of the case in the Patent Office.

Signed and sealed this 13th day of August, A. D. 1946.

[SEAL]

LESLIE FRAZER,
*First Assistant Commissioner of Patents.*